(12) United States Patent
Tanaka et al.

(10) Patent No.: US 10,351,247 B2
(45) Date of Patent: Jul. 16, 2019

(54) WING AND ANTI-ICING SYSTEM (71) Applicant: Fuji Jukogyo Kabushiki Kaisha, Tokyo (JP)

(72) Inventors: Taro Tanaka, Tokyo (JP); Takeshi Yoshida, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 440 days.

(21) Appl. No.: 15/172,014

(22) Filed: Jun. 2, 2016

(65) Prior Publication Data
US 2016/0362184 A1 Dec. 15, 2016

(30) Foreign Application Priority Data

Jun. 15, 2015 (JP) ................... 2015-120023
Sep. 11, 2015 (JP) ................... 2015-179067

(51) Int. Cl.
*B64D 15/00* (2006.01)
*C09K 3/18* (2006.01)
*B64D 15/12* (2006.01)
*C09D 127/18* (2006.01)
*C09D 133/00* (2006.01)
*C09D 127/12* (2006.01)
*F03D 80/40* (2016.01)

(52) U.S. Cl.
CPC ............ *B64D 15/00* (2013.01); *B64D 15/12* (2013.01); *C09D 127/12* (2013.01); *C09D 127/18* (2013.01); *C09D 133/00* (2013.01); *C09K 3/18* (2013.01); *C08L 2205/02* (2013.01); *C08L 2666/04* (2013.01); *C09K 3/185* (2013.01); *F03D 80/40* (2016.05)

(58) Field of Classification Search
CPC .... B64D 15/00; B64D 15/12; C09D 7/67–69; C09D 127/12–20
USPC .......................................................... 101/13
See application file for complete search history.

(56) References Cited

U.S. PATENT DOCUMENTS

| | | | | |
|---|---|---|---|---|
| 3,772,236 A | * | 11/1973 | Soons .................. | C09D 127/12 524/315 |
| 6,117,555 A | * | 9/2000 | Fujimori ................. | B08B 17/06 428/421 |
| 6,124,388 A | * | 9/2000 | Takai ....................... | C09K 3/18 524/366 |
| 2008/0286473 A1 | * | 11/2008 | Smith .................... | B64D 15/00 427/368 |
| 2009/0208728 A1 | | 8/2009 | Itami et al. | |
| 2009/0304996 A1 | | 12/2009 | Kishikawa et al. | |
| 2015/0044420 A1 | | 2/2015 | Nowak et al. | |

FOREIGN PATENT DOCUMENTS

| | | |
|---|---|---|
| EP | 0 754 738 A1 | 1/1997 |
| EP | 2 415 844 A1 | 2/2012 |
| EP | 2 924 086 A1 | 9/2015 |
| GB | 2 340 495 A | 2/2000 |
| JP | H04-045168 A | 2/1992 |
| JP | 2002-114941 A | 4/2002 |
| JP | 2002-295188 A | 10/2002 |
| JP | 2004-91647 A | 3/2004 |
| JP | 2004-359857 A | 12/2004 |
| JP | 2004-359858 A | 12/2004 |
| JP | 2005-060497 A | 3/2005 |
| JP | 3848334 B2 | 11/2006 |
| JP | 2010-234989 A | 10/2010 |
| JP | 2012-037896 A | 2/2012 |
| JP | 2014-144551 A | 8/2014 |
| JP | 2015-089919 A | 5/2015 |
| WO | WO 2008-072707 A1 | 6/2008 |
| WO | WO 2010-114018 A1 | 10/2010 |

OTHER PUBLICATIONS

Technical Data Sheet for Desothane® HS CA8800/B900 (no date).*
Machine translation of JP 2010-243989 (no date).*
Extended European Search Report dated Dec. 12, 2016.
Japanese Office Action dated Feb. 28, 2017 in Japanese Application No. 2015-179067, with an English translation thereof.
Japanese Office Action dated Apr. 18, 2017 in Japanese Application No. 2015-179067 with an English translation thereof.

* cited by examiner

Primary Examiner — Marc S Zimmer
(74) Attorney, Agent, or Firm — McGinn IP Law Group, PLLC (57) ABSTRACT

A mixed coating material includes: a cold curing resin that undergoes reaction curing at normal room temperature; and a particulate fluororesin. The constituent ratio of the particulate fluororesin in a coating film that is a cured state of the mixed coating material is 43 wt % or more and 82 wt % or less. A wing includes a non-water-repellent coating film that forms an outermost layer in a water droplet impact region in a leading edge portion of the wing; and a water-repellent coating film that is formed of the mixed coating material and that forms an outermost layer in a water-repellent region adjacent to the water droplet impact region P. An anti-icing system includes the wing and a heating unit that heats the water droplet impact region.

16 Claims, 7 Drawing Sheets

| COATING MATERIAL | EXAMPLE 4 | EXAMPLE 5 | EXAMPLE 6 |
|---|---|---|---|
| PARTICULATE FLUORORESIN CONTENT | 74% | 77% | 82% |
| PHOTOGRAPH | | | |
| WATER CONTACT ANGLE [°] | 146 | 149 | —* |
| WATER SLIDING ANGLE [°] | 16 | 17 | —* |
| SURFACE ROUGHNESS [μm] | 7.92 | —* | 10.38 |

* NOT MEASURED

WING AND ANTI-ICING SYSTEM

CROSS-REFERENCE TO RELATED APPLICATIONS

The present application claims priority from Japanese Patent Application No. 2015-120023 filed on Jun. 15, 2015, and Japanese Patent Application No. 2015-179067 filed on Sep. 11, 2015, the entire contents of which are hereby incorporated by reference.

BACKGROUND

1. Technical Field

The present invention relates to a mixed coating material, a wing, and an anti-icing system, in particular, to a technique that enables effective anti-icing for wings of aircraft, for example.

2. Related Art

Anti-icing equipment is conventionally provided in aircraft for the purpose of preventing icing or the progress of icing in airframes. Examples of such anti-icing equipment include thermal anti-icing equipment relying on engine bleed air or electricity, pneumatic deicing equipment relying on deicing boots, and chemical deicing equipment using alcohol. The role of anti-icing equipment in aircraft is to prevent icing or the progress of icing in the airframe, to avert thereby wasteful consumption of airframe fuel during flight, on account of hampering of smooth flow of air around the airframe, and increased air resistance derived from a reduction in wing lift, caused by icing.

Even in aircraft provided with anti-icing equipment, however, there are portions where icing cannot be completely controlled in practice by the anti-icing equipment, i.e. some icing occurs at portions beyond the anti-icing equipment capabilities. This inability of combating formation and growth of ice at portions, in the airframe, beyond the anti-icing equipment capabilities exerts a significant negative impact in terms of wasteful consumption of aviation fuel, due to the increased resistance during flight at those portions that lie outside the reach of the anti-icing equipment capabilities.

In order to solve this problem, it would be conceivable to increase the scale of the anti-icing equipment, or to run the anti-icing equipment more intensively, also for portions in the airframe that lie outside the reach of the anti-icing equipment capabilities, such as antennas, flap hinges, control horns and the like. However, this approach of extending the anti-icing effect elicited by the anti-icing equipment to portions beyond the anti-icing equipment capabilities has been thus far difficult to realize, on account of the increased airframe weight that results from increasing the scale of the anti-icing equipment, and the consumption of airframe fuel incurred in running the anti-icing equipment more intensively, all of which translates, contrarily, into yet greater consumption of the limited airframe fuel.

Research is accordingly being conducted to meet the demand of the industry for a coating material that elicits a high anti-icing effect and that enables easy application of the anti-icing effect also to portions in the airframe that lie outside the reach of the anti-icing equipment capabilities, i.e. an anti-icing effect that applies to all airframe surfaces, and such that, when used, the coating material adds little to the weight of the airframe, and does not incur thus wasteful consumption of fuel during flight.

Coating materials having a high anti-icing effect having been proposed thus far include mixed coating materials that enable formation of highly water-repellent coating films, specifically, for instance, a mixed coating material (hereafter referred to as "AIS") that is obtained by mixing a mixed resin of an ultraviolet curable resin and a tetrafluoroethylene resin, with an organic solvent including a hydrofluorocarbon, in which the hardness of the coating film is 1H or higher (see Japanese Patent No. 3848334). A wing structure (anti-icing system) has also been proposed that has a wing using AIS as a coating material and a heater attached to the wing (see Japanese Unexamined Patent Application Publication (JP-A) No. 2010-234989).

However, AIS is a coating material of ultraviolet curable type, and hence is not easy to use as a coating material for large structures, such as aircraft. In addition, coating films formed of AIS have low durability: specifically, the water-repellency performance tends to degrade due to erosion.

SUMMARY OF THE INVENTION

It is desirable to provide a mixed coating material that enables formation of a water-repellent coating film having high durability and is cured at normal room temperature, and a wing and an anti-icing system that enables efficient anti-icing.

An aspect of the present invention provides a mixed coating material including a cold curing resin that undergoes reaction curing at normal room temperature and a particulate fluororesin, in which a constituent ratio of the particulate fluororesin in a coating film that is a cured state of the mixed coating material is 43 wt % or more and 82 wt % or less.

The particulate fluororesin may be a tetrafluoroethylene resin.

The cold curing resin may be a fluororesin.

The particulate fluororesin may have an average particle size of less than 1.5 µm.

The particulate fluororesin may have an average particle size of less than 1.0 µm.

An aspect of the present invention provides a wing including a non-water-repellent coating film that forms an outermost layer in a water droplet impact region in a leading edge portion of the wing, and a water-repellent coating film that is formed of the mixed coating material and that forms an outermost layer in a water-repellent region adjacent to the water droplet impact region.

The non-water-repellent coating film may extend from the water droplet impact region to the water-repellent region, and the water-repellent coating film may be on the non-water-repellent coating film.

An aspect of the present invention provides an anti-icing system including the wing and a heater that heats the water droplet impact region.

The heater may also heat at least a portion of the water-repellent region, the portion being close to the water droplet impact region.

DETAILED DESCRIPTION

Hereinafter, a mixed coating material, a wing, and an anti-icing system according to implementations of the present invention will be described.

Mixed Coating Material

A mixed coating material of an implementation is a cold curing coating material. Specifically, the mixed coating material of the implementation contains a cold curing resin and a particulate fluororesin, and undergoes reaction curing at normal room temperature. A coating film is made up of the cold curing resin and the particulate fluororesin. Herein, the term "coating film" denotes a coating film in a cured state.

Examples of cold curing resin include polyurethane resins, fluororesins, acrylic urethane resins, acrylic resins, and epoxy resins. These resins can be used alone or in combination, to thereby increase the strength of the coating film of the mixed coating material. Thus, the coating film tends not to peel off from the surface of the coated body even under erosion conditions.

The particulate fluororesin is preferably, for example, a tetrafluoroethylene resin (hereafter referred to as "PTFE").

Such PTFE is prepared for instance in accordance with the production method of Japanese Patent No. 1937532. The PTFE is not limited to being prepared in accordance with the above production method, and it suffices that the PTFE can be appropriately mixed with the cold curing resin. In particular, the PTFE preferably provides a high water-repellent effect and is appropriately mixed with the cold curing resin. Accordingly, the PTFE preferably has a low molecular weight, specifically an average molecular weight ranging from 500 to 5,000.

The particulate fluororesin is not limited to PTFE, and another desirable fluororesin can be appropriately selected. Preferably, however, the particulate fluororesin has high water-repellent effect similar or superior to that of PTFE, and can be mixed appropriately with the cold curing resin.

When a coating film is regarded as a highly water-repellent coating film, the coating film preferably has a water contact angle of 100° or larger, more preferably 120° or larger. When the coating film having high water repellency further has high water slippage (i.e. a property that enables water to slip readily over the coating film), the coating film can be expected to afford a higher anti-icing effect. When a coating film is regarded as a highly water-slippery coating film, the coating film preferably has a water sliding angle of 10° or smaller. However, when the coating material has a low mixing ratio of the particulate fluororesin with respect to the total resin components (cold curing resin+particulate fluororesin), a highly water-repellent coating film and a highly water-slippery coating film cannot be obtained. Conversely, when the coating material has a high mixing ratio of the particulate fluororesin, the coating material has a low mixing ratio of the cold curing resin with respect to the total resin components, so that the resultant coating film has low durability and may fail to have desired durability.

Accordingly, the coating material preferably has a mixing ratio of the particulate fluororesin with respect to the total resin components so as to obtain a coating film having a water contact angle of 100° or larger and to obtain a coating film having desired durability by smoothly performing the coating operation; more preferably has the mixing ratio so as to obtain a coating film having a water contact angle of 120° or larger and to obtain a coating film having desired durability by smoothly performing the coating operation; and yet more preferably has the mixing ratio so as to obtain a coating film having a water contact angle of 120° or larger and a water sliding angle of 10° or smaller and to obtain a coating film having desired durability by smoothly performing the coating operation.

Similarly, the coating film preferably has a constituent ratio of the particulate fluororesin such that the coating film has a water contact angle of 100° or larger and has desired durability; more preferably has the constituent ratio such that the coating film has a water contact angle of 120° or larger and has desired durability; and yet more preferably has the constituent ratio such that the coating film has a water contact angle of 120° or larger and a water sliding angle of 10° or smaller, and has desired durability.

Hereinafter, a non-limiting method for producing the mixed coating material of the implementation will be described.

The cold curing resin and the particulate fluororesin are mixed by an ordinary mixing method. This provides a liquid mixed coating material.

Examples of the material to which the obtained mixed coating material can be applied include simple metals such as aluminum, iron, and copper, alloys of the foregoing, pottery items such as tiles, plastics such as PET, paper, cloth, nonwoven fabrics, and coating film surfaces. Specifically, the mixed coating material is effective when being applied to structures that require water-proofing and anti-icing, for instance, transportation equipment such as aircraft, wind turbine blades, antennas, electric wires, and buildings.

The mixed coating material of the implementation of the present invention cures at normal room temperature, i.e. just by being left to stand after application. Accordingly, the mixed coating material can be used suitably as a coating material for large structures such as aircraft. It is known that coating films formed of cold curing coating materials have high durability due to the presence of cold curing resins. Similarly, a coating film formed of the mixed coating material of the implementation of the present invention contains a cold curing resin. Thus, a water-repellent coating film having high durability can be obtained, compared with the conventional coating material (AIS) that is a mixture of an ultraviolet curable resin and PTFE.

Wing and Anti-Icing System

Figure 1A:
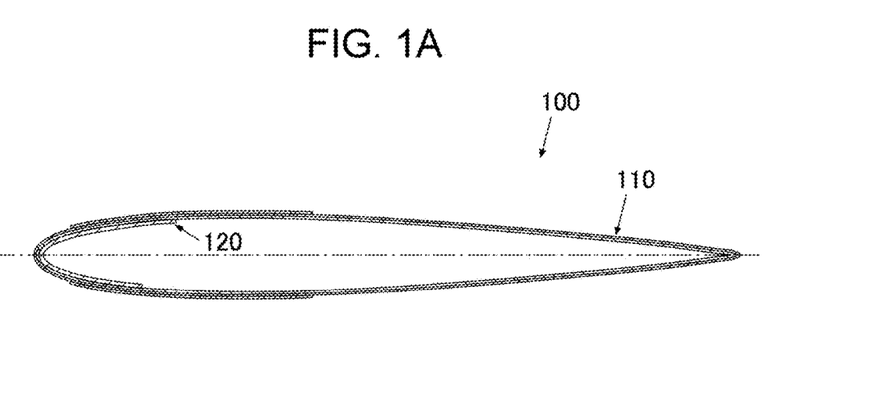
FIG. 1A is a cross-sectional view of a wing and an anti-icing system according to implementations.
Figure 1B:
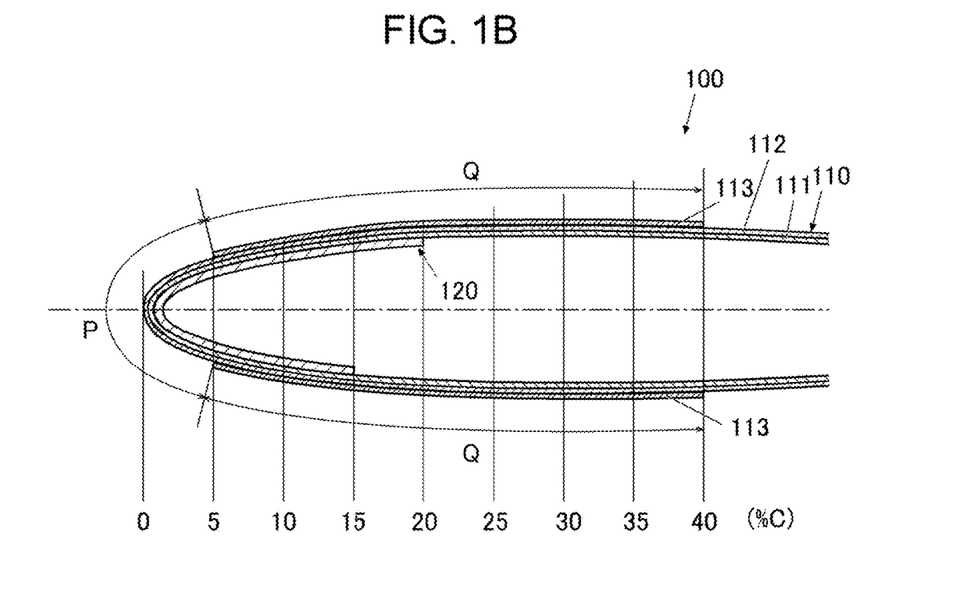
FIG. 1B is an enlarged view of a main part of the wing and the anti-icing system in FIG. 1A.

FIG. 1A is a cross-sectional view of a wing 110 and an anti-icing system 100 according to implementations. FIG. 1B is an enlarged view of the main part of the wing 110 and the anti-icing system 100.

The wing 110 of the implementation is an aircraft wing. On the surface of a wing main body 111, there are a non-water-repellent coating film 112 and a water-repellent coating film 113. The wing 110 is not limited to aircraft wings and examples thereof include wind turbine blades, fan blades of aircraft engines, and wings that create downforce for, for instance, vehicles.

The anti-icing system 100 of the implementation includes the wing 110 of the implementation and a heating unit 120. In one implementation, the heating unit 120 may serve as a "heater" that heats a water droplet impact region P.

Normally, during take-off and landing of aircraft, the wing 110 faces, at a certain angle (elevation), relative air flow. At this time, most of supercooled water droplets that cause icing impact on a certain region of the leading edge portion of the wing. This region on which water droplets are expected to impact (water droplet impact region P) depends on, for example, the flight speed of aircraft, the wing angle with respect to relative air flow, the size of water droplets, and the airfoil. When such parameters are specified, the water droplet impact region P can be uniquely determined.

FIGS. 1A and 1B illustrate an implementation in which the water droplet impact region P is a surface area corresponding to a chord length (measured from the leading edge of the wing 110) of 0 to 5%.

In the implementation, in order to heat the water droplet impact region P, the heating unit 120 constituted by, for example, an electric heater is disposed at a certain inside position of the leading edge portion of the wing, the position corresponding to at least the water droplet impact region P. In one implementation, the heating unit 120 may serve as a "heater". The heating unit 120 is connected to, for example, a temperature controller (see FIG. 6) that controls the temperature of the heating unit 120.

FIGS. 1A and 1B illustrate an implementation in which the heating unit 120 can heat an area corresponding to a chord length of 0 to 20% and extending from the leading edge to the upper surface, and an area corresponding to a chord length of 0 to 15% and extending from the leading edge to the lower surface. Stated another way, in the implementation of FIGS. 1A and 1B, the heating unit 120 is disposed so as to heat not only the water droplet impact region P but also a portion of a water-repellent region Q adjacent to the water droplet impact region P, the portion being close to the water droplet impact region P. Thus, the heating unit 120 also heats at least a portion of the water-repellent region Q, the portion being close to the water droplet impact region P, so that anti-icing can be achieved with more certainty. In one implementation, the heating unit 120 may serve as a "heater".

The configuration of the heating unit 120 such as the area where the heating unit 120 is disposed and the number of the heating units 120 is not limited to the configuration in FIGS. 1A and 1B and can be appropriately changed as long as the heating unit 120 can heat at least the water droplet impact region P.

The surface of the wing 110 of the implementation has the water-repellent region Q. In the water-repellent region Q, a water-repellent coating material (mixed coating material of the implementation) prepared by mixing a base material (cold curing resin) and a fine powder (particulate fluororesin) is applied, to thereby provide a coated surface having high surface roughness. As a result, the water-repellent region Q exhibits water repellency.

FIGS. 1A and 1B illustrate an implementation in which the area of the upper and lower surfaces corresponding to a chord length (measured from the leading edge) of 5 to 40% is the water-repellent region Q in which the outermost layer is the water-repellent coating film 113.

In the implementation, as illustrated in FIG. 1B, the water-repellent coating film 113 is not formed in the water droplet impact region P in the leading edge portion of the wing. This is an anti-icing structure employed on the basis of a finding that a surface structure having high surface roughness causes an increase in the ice adhesion strength in the case of dynamic icing. In the wing 110 of the implementation employing the anti-icing structure, supercooled water droplets impact the leading edge portion of the wing to form ice nuclei; the ice nuclei are melted into water by heat of the heating unit 120; the water then reaches the water-repellent region Q, is repelled by the water-repellent structure of the surface of the water-repellent region Q, and is finally separated from the wing 110 by air resistance. Herein, the term "dynamic icing" means icing of water droplets upon impact on an object at speed, for example, the icing occurring on aircraft wings during take-off and landing.

In general, compared with non-water-repellent coating films, water-repellent coating films have low abrasion resistance and low erosion resistance. Accordingly, erosion of water-repellent coating films occurs due to being impacted by, for example, moisture, dust, and insects in the air. However, in the wing 110 of the implementation, the water-repellent coating film 113 is not formed in the water droplet impact region P on which dust etc. in the air is expected to impact most frequently. Thus, erosion of the water-repellent coating film 113 is avoided, resulting in a reduction in maintenance costs.

In the wing 110 of the implementation, the outermost layer of the water droplet impact region P in which the water-repellent coating film 113 is not formed, can be the non-water-repellent coating film 112 formed of a coating material commonly used for the surfaces of aircraft wing bodies, such as a polyurethane coating material. The probable mechanism by which a surface structure having high surface roughness causes an increase in the ice adhesion strength in the case of dynamic icing is as follows: when a water droplet impacts a water-repellent coating film at a relative velocity of about 40 to about 100 m/s, the water droplet is not repelled by the film surface but enters irregularities in the film surface and freezes therein; accordingly, the higher the surface roughness of the structure, the higher the ice adhesion strength due to the anchoring effect of the structure. For this reason, the outermost layer of the water droplet impact region P in the leading edge portion of the wing is preferably the non-water-repellent coating film 112 formed of, for example, a polyurethane coating material, that is, a coating film having lower surface roughness than the water-repellent coating film 113; more preferably, the outermost layer is a coating film having even lower surface roughness than the existing coating films formed of polyurethane coating materials and the like.

Thus, in the wing 110 of the implementation, the outermost layer of the water droplet impact region P of the leading edge portion of the wing is the non-water-repellent coating film 112, while the outermost layer of the water-repellent region Q adjacent to the water droplet impact region P is the water-repellent coating film 113 formed of the mixed coating material of the implementation.

In the wing 110 of the implementation, in order to maintain the water repellency (surface property) of the water-repellent region Q, the probability of mechanical contact with the water-repellent region Q is preferably minimized. Accordingly, the area of the water-repellent region Q is preferably minimized (as long as desired anti-icing performance is achieved) from the viewpoint of enhancing the efficiency of inspection and maintenance.

Incidentally, the outermost layer of a region that is adjacent to the water-repellent region Q and extends to the trailing edge of the wing can be the non-water-repellent coating film 112, for example.

The wing 110 of the implementation can be produced by coating the entirety of the wing main body 111 with, for example, a polyurethane coating material to form the non-water-repellent coating film 112, and subsequently coating only an area to be the water-repellent region Q with the mixed coating material of the implementation to form the water-repellent coating film 113. Thus, as illustrated in FIGS. 1A and 1B, in the wing 110 of the implementation, the non-water-repellent coating film 112 is formed so as to extend from the water droplet impact region P to the water-repellent region Q, and the water-repellent coating film 113 is formed on the non-water-repellent coating film 112.

Alternatively, as described in JP-A No. 2010-234989, different coating materials can be individually applied to corresponding areas such that the non-water-repellent coating film 112 is not formed in the water-repellent region Q. Specifically, an area other than the area to be the water-repellent region Q can be coated with, for example, a polyurethane coating material, whereas the area to be the water-repellent region Q can be coated not with the polyurethane coating material or the like but with only the mixed coating material of the implementation. However, the implementation of not applying different coating materials individually to corresponding areas enables a simpler coating process for the wing main body 111.

In addition, when different coating materials are individually applied to corresponding areas, erosion of the water-repellent coating film 113 results in exposure of the wing main body 111. In contrast, in the implementation of not applying different coating materials individually to corresponding areas, erosion of the water-repellent coating film 113 does not result in exposure of the wing main body 111 but in mere exposure of the undercoating (non-water-repellent coating film 112) of the water-repellent coating film 113. As a result, a reduction in maintenance costs can be achieved.

In the wing 110 and the anti-icing system 100 according to the implementations of the present invention, the outermost layer of the water droplet impact region P in the leading edge portion of the wing is the non-water-repellent coating film 112, while the outermost layer of the water-repellent region Q adjacent to the water droplet impact region P is the water-repellent coating film 113 formed of the mixed coating material of the implementation. Accordingly, icing can be effectively prevented in the environment of exposure to high-speed supercooled water droplets. Thus, anti-icing can be efficiently achieved.

EXAMPLES

Hereinafter, examples of the present invention will be described. Note that the present invention is not limited to these examples.

Example 1

A coating material of Example 1 was obtained by mixing a polyurethane resin as a cold curing resin and PTFE (low molecular weight PTFE) as a particulate fluororesin such that, in the coating film, the constituent ratio of the cold curing resin was 56.4 wt % and the constituent ratio of the particulate fluororesin was 43.6 wt %. In the coating material of Example 1, the particulate fluororesin had an average particle size of 1.15 μm.

Example 2

A coating material of Example 2 was obtained as with the coating material of Example 1 except that, in the coating film, the constituent ratio of the polyurethane resin was 32.7 wt % and the constituent ratio of the particulate fluororesin was 67.3 wt %. In the coating material of Example 2, the particulate fluororesin had an average particle size of 1.15 μm.

Example 3

A coating material of Example 3 was obtained by mixing a fluororesin as a cold curing resin and PTFE (low molecular weight PTFE) as a particulate fluororesin such that, in the coating film, the constituent ratio of the cold curing resin was 34.2 wt % and the constituent ratio of the particulate fluororesin was 65.8 wt %. In the coating material of Example 3, the particulate fluororesin had an average particle size of 0.96 μm.

Comparative Example 1

As a coating material of Comparative example 1, a commercially available polyurethane coating material was prepared.

Comparative Example 2

A coating material of Comparative example 2 was obtained as with the coating material of Example 1 except that, in the coating film, the constituent ratio of the polyurethane resin was 74.4 wt % and the constituent ratio of the particulate fluororesin was 25.6 wt %.

Comparative Example 3

As a coating material of Comparative example 3, AIS was obtained in the following manner. An acrylic resin (10 g, UV-75, Origin Electric Co., Ltd.) having a coating film hardness of 5H was mixed with 11 g of dry PTFE. To the resultant mixture of these resins, an organic solvent was added that was a mixture of 24 g of a hydrofluorocarbon (Du Pont-Mitsui Fluorochemicals Company, Ltd.) and 55 g of isopropyl alcohol. After the addition, the mixtures were stirred at room temperature for 5 minutes in a disperser. This was followed by stirring for 15 minutes using a Motor Mill (Eiger Japan Corporation).

Comparative Example 4

As a coating material of Comparative example 4, an existing water-repellent coating material was prepared. This water-repellent coating material enables formation of a coating film that provides water repellency without involving an increase in the surface roughness of the coated surface.

Evaluation of Water Repellency and Water Slippage

The coating material of Example 1 was diluted, as needed, using a solvent such as a thinner, applied to an aluminum alloy surface with an air spray gun (manufactured by ANEST IWATA Corporation), and cured at normal room temperature, to obtain a sample produced through application of the coating material of Example 1. The coating with the air spray gun was performed by repeating over-spraying three times (film thickness: 30 μm to 50 μm).

As with the sample produced through application of the coating material of Example 1, another sample was produced through application of the coating material of Example 2, another sample was produced through application of the coating material (polyurethane coating material) of Comparative example 1, and another sample was produced through application of the coating material of Comparative example 2.

Another sample was produced through application of the coating material (AIS) of Comparative example 3 as with the sample produced through application of the coating material of Example 1 except that the coating material (AIS) was cured through irradiation with ultraviolet rays.

To evaluate water repellency and water slippage, the water contact angle and the water sliding angle of each sample were measured at room temperature using a contact angle meter (manufactured by Kyowa Interface Science Co., Ltd.).

The results are described in Table 1 and Table 2. The sample produced through application of the coating material (polyurethane coating material) of Comparative example 1 was not measured in terms of water sliding angle.

TABLE 1

| Coating material | | Particulate fluororesin content | Water contact angle | Water sliding angle |
|---|---|---|---|---|
| Comparative example 1 | Polyurethane coating material | 0 wt % | About 80° | — |
| Comparative example 2 | Particulate fluororesin & polyurethane coating material | 25.6 wt % | 82° | 12° |
| Example 1 | Particulate fluororesin & polyurethane coating material | 43.6 wt % | 100° | 18° |
| Example 2 | Particulate fluororesin & polyurethane coating material | 67.3 wt % | 149° | 5° |

The results in Table 1 indicate that the higher the particulate fluororesin content (constituent ratio of the particulate fluororesin in the coating film), the larger the water contact angle is; and that a particulate fluororesin content of 43.6 wt % or higher results in a water contact angle of 100° or larger.

More preferably, the water contact angle is 120° or larger. In light of results of Table 1, it is estimated that the water contact angle is 120° or larger when the particulate fluororesin content is about 50 wt % or greater.

Yet more preferably, the water contact angle is 120° or larger and the water sliding angle is 10° or smaller. In light of results of Table 1, it is estimated that the water contact angle is 120° or larger and the water sliding angle is 10° or smaller, when the particulate fluororesin content is about 55 wt % or higher.

TABLE 2

| Coating material | | Water contact angle | Water sliding angle |
|---|---|---|---|
| Comparative example 3 | AIS (UV-curable water-repellent coating material) | 130° to 160° | 1° to 7° |

TABLE 2-continued

| Coating material | | Water contact angle | Water sliding angle |
|---|---|---|---|
| Example 2 | Particulate fluororesin & polyurethane coating material | 140° to 160° | 2° to 7° |

Table 2 describes results of measurements on water contact angle and water sliding angle of a plurality of samples produced through application of the coating material of Example 2, and a plurality of samples produced through application of the coating material (AIS) of Comparative example 3.

The results of Table 2 indicate that the coating material of Example 2 delivers a performance similar to that of the coating material of Comparative example 3, AIS, which is a highly anti-icing coating material.

The samples produced through application of the coating material of Example 2 exhibited smaller variation in water contact angle and smaller variation in water sliding angle than the samples produced through application of the coating material (AIS) of Comparative example 3. This is probably because the coating film formed through application of the coating material of Example 2 has a fractal surface layer structure and a homogeneous surface distribution of PTFE, compared with the coating film formed through application of the coating material (AIS) of Comparative example 3.

Figure 2A:
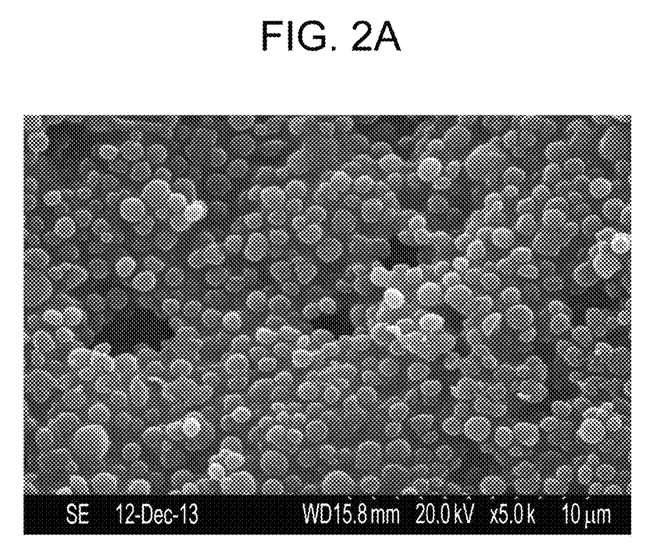
FIG. 2A illustrates a SEM micrograph of the surface of a coating film formed through application of a coating material of Example 2.
Figure 2B:
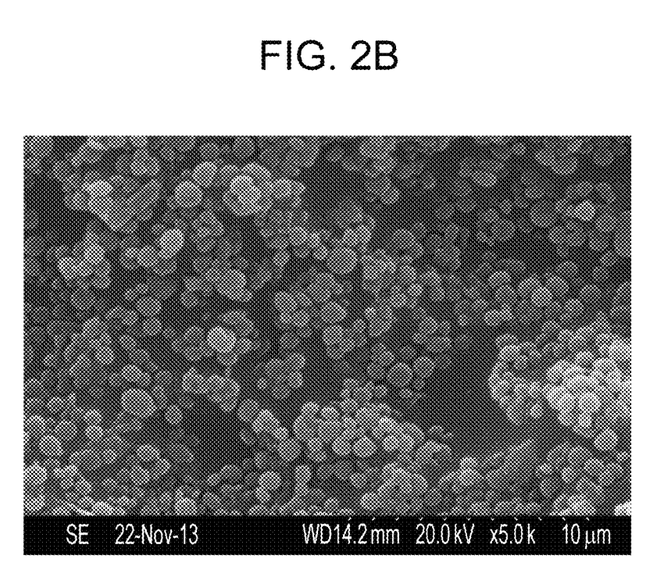
FIG. 2B illustrates a SEM micrograph of the surface of a coating film formed through application of a coating material (AIS) of Comparative example 3.

FIG. 2A illustrates a SEM micrograph of the surface of a coating film formed through application of the coating material of Example 2. FIG. 2B illustrates a SEM micrograph of the surface of a coating film formed through application of the coating material (AIS) of Comparative example 3.

These SEM micrographs indicate that the coating film (see FIG. 2A) formed through application of the coating material of Example 2 has a fractal surface layer structure, compared with the coating film (see FIG. 2B) formed through application of the coating material (AIS) of Comparative example 3. The particulate bodies in the SEM micrographs are PTFE. The SEM micrographs also indicate that the coating film formed through application of the coating material of Example 2 (see FIG. 2A) has a homogeneous surface distribution of PTFE, compared with the coating film (see FIG. 2B) formed through application of the coating material (AIS) of Comparative example 3.

Evaluation of Durability

A rain erosion test was performed in order to evaluate the durability of coating films.

Figure 3A:
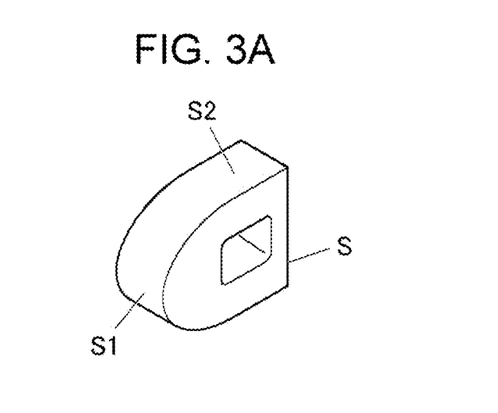
FIG. 3A is a schematic view of a specimen used in a rain erosion test.
Figure 3B:
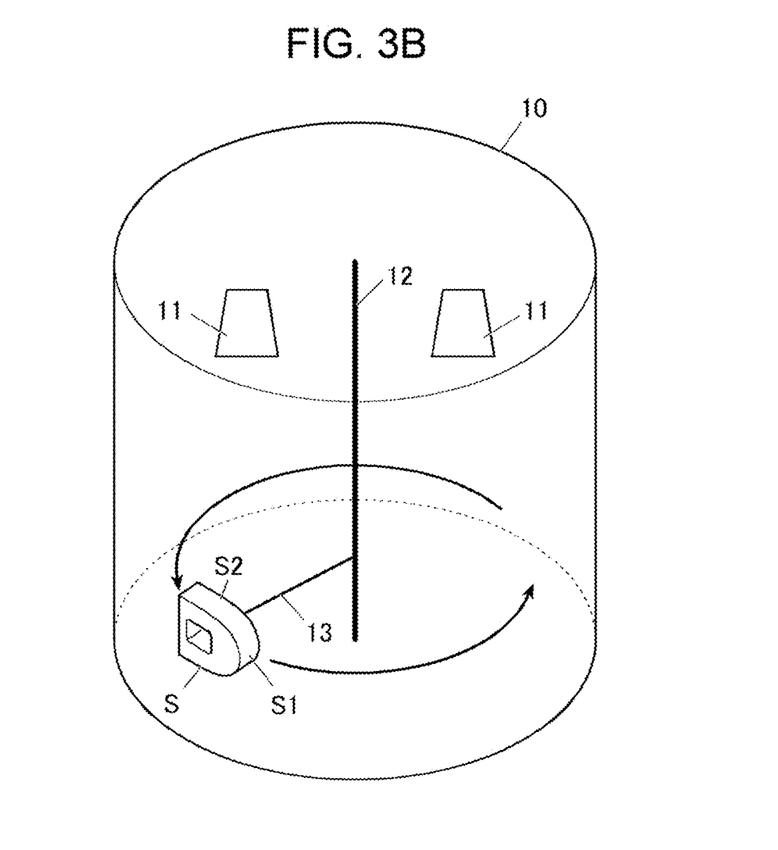
FIG. 3B is a schematic view of a rain erosion tester used in a rain erosion test.

FIG. 3A is a schematic view of a specimen S used in the rain erosion test. FIG. 3B is a schematic view of a rain erosion tester 10 used in the rain erosion test.

As illustrated in FIG. 3A, the specimen S has a D-shape. In the curved surface that forms the D-shape, the portion of large curvature will be referred to as portion S1, and one of the portions of small curvature will be referred to as portion S2.

As illustrated in FIG. 3B, the rain erosion tester 10 includes, within its cylindrical main body, spray nozzles 11, 11 for spraying a predetermined amount of water droplets, a rotating shaft 12 for rotating the specimen S, and a coupling member 13 for coupling together the rotating shaft 12 and the specimen S. The rain erosion test was performed in the following manner: the specimen S was attached to the coupling member 13 such that, during rotation, the portion S1 of the specimen S pointed in the rotation direction, and the portion S2 of the specimen S faced upward (towards the spray nozzles 11); the specimen S was rotated at the bottom within the main body of the rain erosion tester 10; and water droplets were dropped from the spray nozzles 11, 11 that were disposed at the top within the main body of the rain erosion tester 10, so that the water droplets impacted the surface of the specimen S. The test was performed under conditions of a rainfall amount of 25 mm per hour and a specimen speed of 120 mm per second.

The coating material of Example 2 was applied, with an air spray gun (manufactured by ANEST IWATA Corporation), onto the surface of an aluminum specimen body having been subjected to chemical conversion coating treatment and then to degreasing; and the coating material was cured at normal room temperature, to obtain a specimen S produced through application of the coating material of Example 2. The coating with the air spray gun was performed by repeating over-spraying three times (film thickness: 30 µm to 50 µm).

As with the specimen S produced through application of the coating material of Example 2, another specimen S was produced through application of the coating material (polyurethane coating material) of Comparative example 1.

As with the specimen S produced through application of the coating material of Example 2, another specimen S was produced through application of the coating material (AIS) of Comparative example 3 except that the coating material (AIS) was cured through irradiation with ultraviolet rays.

Photographs of the specimens S were taken before and after the rain erosion test. The results are provided in FIG. 4 and FIG. 5.

Figure 4:
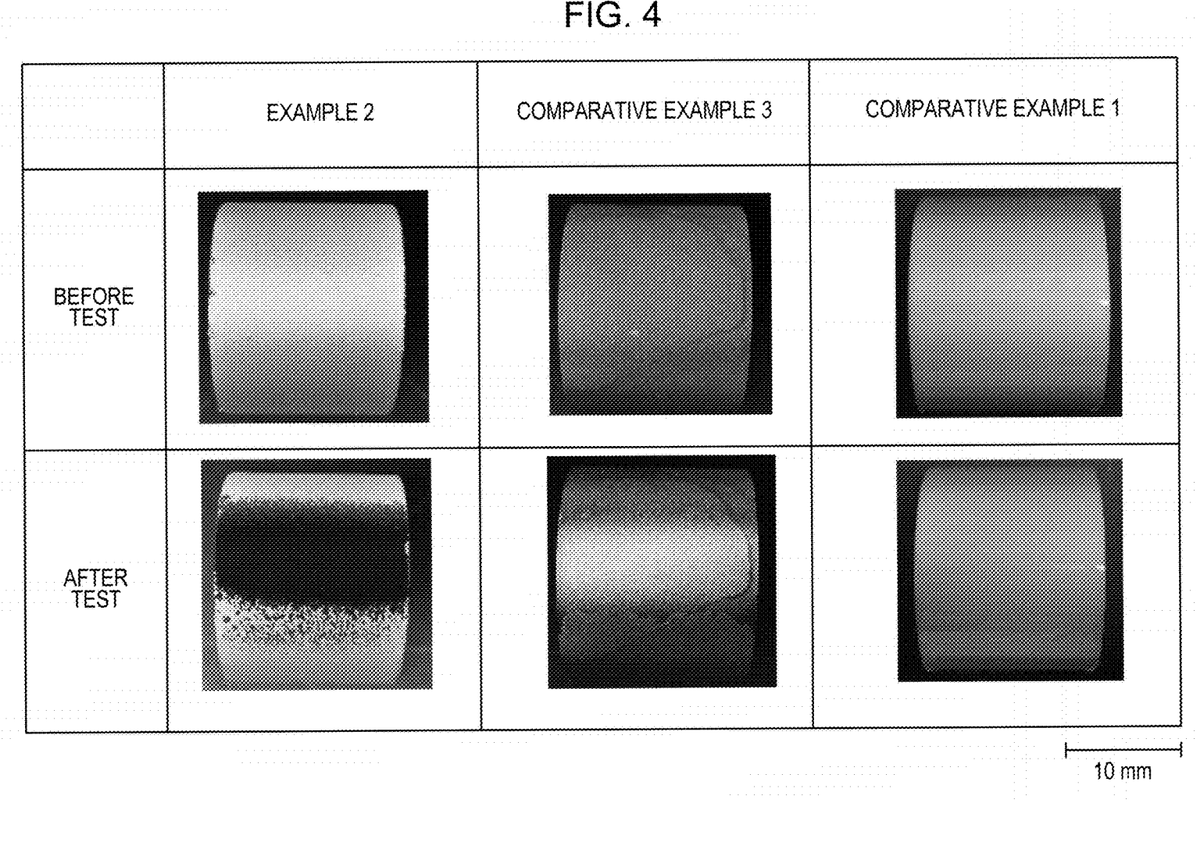
FIG. 4 illustrates specimen photographs taken before and after a rain erosion test.

FIG. 4 indicates the following. The coating film peeled at a portion that tends to be eroded as a result of the rain erosion test, specifically, the portion S1, in the specimen S produced through application of the coating material of Example 2 and the specimen S produced through application of the coating material (AIS) of Comparative example 3. In contrast, the rain erosion test did not cause peeling of the coating film in the specimen S produced through application of the coating material (polyurethane coating material) of Comparative example 1.

Figure 5:
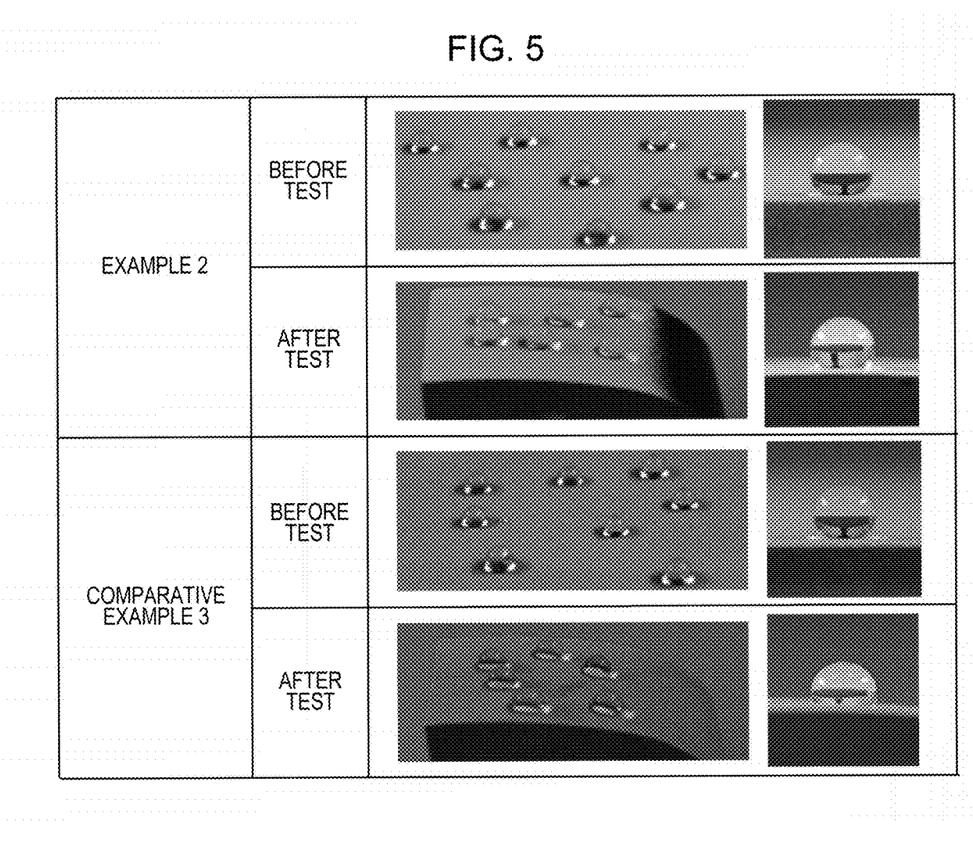
FIG. 5 illustrates specimen photographs taken before and after a rain erosion test.

On the other hand, FIG. 5 indicates the following. The rain erosion test did not substantially cause degradation of the water repellency of a portion that tends not to be eroded, specifically, the portion S2, in the specimen S produced through application of the coating material of Example 2, whereas the rain erosion test caused degradation of the water repellency of a portion that tends not to be eroded, specifically the portion S2, in the specimen S produced through application of the coating material (AIS) of Comparative example 3. Stated another way, in the coating film formed through application of the coating material (AIS) of Comparative example 3, as erosion proceeds and the coating film thins, the water-repellency performance degrades; whereas, in the coating film formed through application of the coating material of Example 2, even when erosion proceeds and the coating film thins, the water-repellency performance does not substantially degrade, which indicates that the coating film has high durability. This is probably because the polyurethane resin having durability was used as the cold curing resin in the coating material of Example 2, resulting in enhanced durability of the coating film.

Evaluation of Anti-Icing Performance

In order to evaluate the anti-icing performance of a wing and an anti-icing system, an icing wind tunnel test simulating an aircraft flight environment was performed.

Figure 6:
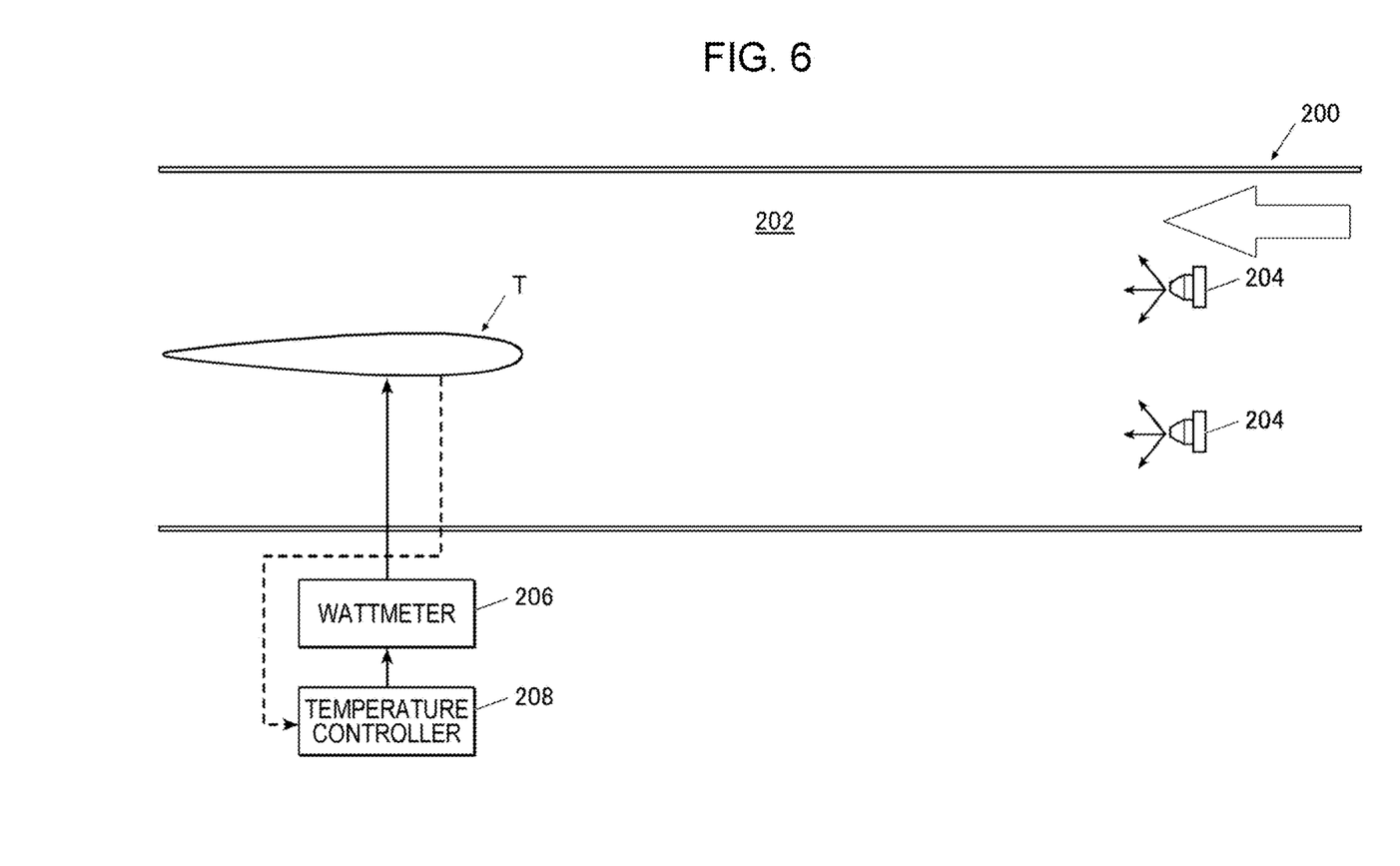
FIG. 6 is a schematic view of an airfoil specimen and a dynamic icing growth apparatus used in an icing wind tunnel test.

FIG. 6 is a schematic view of an airfoil specimen T and a dynamic icing growth apparatus 200 used in the icing wind tunnel test.

The coating material of Comparative example 1 was applied with an air spray gun to the whole surface of an aluminum specimen body having been subjected to chemical conversion coating treatment and a primer coating process, such that the resultant film had a thickness of 50 µm, and was cured at normal room temperature. Thus, an airfoil specimen T was obtained. Hereafter, this specimen will be referred to as "Sample 1".

The coating material of Example 3 was applied with an air spray gun to, in Sample 1, an area corresponding to a chord length (measured from the leading edge) of 5 to 40% (the same as the area where the water-repellent coating film 113 is formed in FIG. 1B) such that the resultant film had a thickness of 50 µm, and was cured at normal room temperature. Thus, an airfoil specimen T was obtained. Hereafter, this specimen will be referred to as "Sample 2".

The coating material of Comparative example 4 was applied as in Sample 2. Thus, an airfoil specimen T was obtained. Hereafter, this specimen will be referred to as "Sample 3".

The coating films (film thickness: 50 µm) formed of the coating material of Example 3 and the coating materials of Comparative examples 1 and 4 were evaluated in terms of surface roughness, water contact angle, and water sliding angle at normal room temperature.

The results are described in Table 3.

TABLE 3

| | Coating material | | |
| --- | --- | --- | --- |
| Performance | Comparative example 1 (polyurethane coating material) | Example 3 (particulate fluororesin & fluororesin coating material) | Comparative example 4 (water-repellent coating material) |
| Surface roughness [µm] | 0.1 | 6.4 | 1.7 |
| Water contact angle [°] | 91 | 154 | 101 |
| Water sliding angle [°] | 57 | 4 | — (no sliding even at 90°) |

The results in Table 3 indicate that the coating material of Example 3 enables formation of a coating film that has a water contact angle of 120° or larger and a water sliding angle of 10° or smaller, that is, a highly water-repellent and highly water-slippery coating film.

Subsequently, a heating unit 120 was attached to each of Samples 1 to 3.

In order to simulate icing caused by high-speed impact of supercooled water droplets on an object in the air, the dynamic icing growth apparatus 200 in FIG. 6 was produced. An icing wind tunnel test was performed in the following manner: at a downstream position of an air flow tunnel 202 of the dynamic icing growth apparatus 200, a Sample (airfoil specimen T) was disposed such that the leading edge portion of the wing was oriented upstream; while the temperature within the air flow tunnel 202 was kept constant, a laminar flow was fed at a constant rate from the upstream side of the air flow tunnel 202 and sprayers 204 disposed upstream were used to spray mist with constant LWC and MVD. The test was performed under conditions of a temperature of −15° C., a wind speed of 95 m/s, an LWC of 0.3 g/m³, and an MVD of 18 µm. Here, the term "MVD" (Median Volume Diameter) means the diameter at the median in the volume distribution of water droplets scattered within the dynamic icing growth apparatus 200; and the term "LWC" (Liquid Water Content) means the water content per volume.

The Sample was connected to a wattmeter 206 and a temperature controller 208. The temperature controller 208 was used to change the set temperature of the heating unit 120 attached to the Sample, during which the wattmeter 206 was used to measure the power consumption of the heating unit 120. The set temperature was changed to 10° C., 15° C., 20° C., 30° C., 50° C., and 60° C.

In this evaluation, the heating unit 120 was used to heat an area corresponding to a chord length of 0 to 15%. For each set temperature, the Sample was inspected after a lapse of 10 minutes from the beginning of the test to determine whether or not icing on the surface had occurred.

In Sample 1 (Sample not having a water-repellent region), the minimum set temperature of preventing icing was found to be 60° C.

In Sample 2 (Sample having a water-repellent region formed of the coating material of Example 3), the minimum set temperature of preventing icing was found to be 15° C.

In Sample 3 (Sample having a water-repellent region formed of the coating material of Comparative example 4), the minimum set temperature of preventing icing was found to be 50° C.

In a conventional anti-icing system of heating the leading edge portion of the wing with a heating unit to melt and remove ice accretions, ice nuclei formed on the leading edge portion of the wing by the impact of supercooled water droplets are melted into liquid-phase water by heat generated from the heating unit disposed within the leading edge portion of the wing. However, while flowing in the chord direction over the wing surface due to air resistance, the water, once melted, freezes again and becomes fixed on the wing body. This phenomenon may be addressed in the following manner: by heating at high temperature a heating region directly heated by the heating unit (region on the leading edge side of the wing), heat transfer from this heating region is caused to achieve an increase in the temperature of a non-heating region not directly heated (region on the trailing edge side of the wing) or evaporation of melted water. However, this approach involves very high power consumption. In order to prevent refreezing with minimum power consumption, melted water needs to be repelled by a water-repellent structure while it flows in the chord direction.

Sample 1 does not have a water-repellent region for repelling melted water that is flowing in the chord direction. Accordingly, in order to prevent refreezing of melted water, the heating unit needs to be operated at a set temperature of as high as 60° C., to thereby sufficiently increase the temperature of the non-heating region not directly heated by the heating unit.

In contrast, Samples 2 and 3 have a water-repellent region for repelling melted water that is flowing in the chord direction. Accordingly, the set temperatures of preventing icing in Samples 2 and 3 are lower than the set temperature in Sample 1. And, the Sample in which the set temperature of preventing icing is the lowest has been found to be Sample 2. This is probably because the water-repellent region of Sample 2 has high water repellency and can repel melted water with certainty; accordingly, refreezing can be prevented without increasing the temperature of the non-heating region not directly heated by the heating unit.

For each of the Samples, at the minimum set temperature of preventing icing, the total power consumption (for 10 minutes) of the heating unit 120 was calculated.

Figure 7:
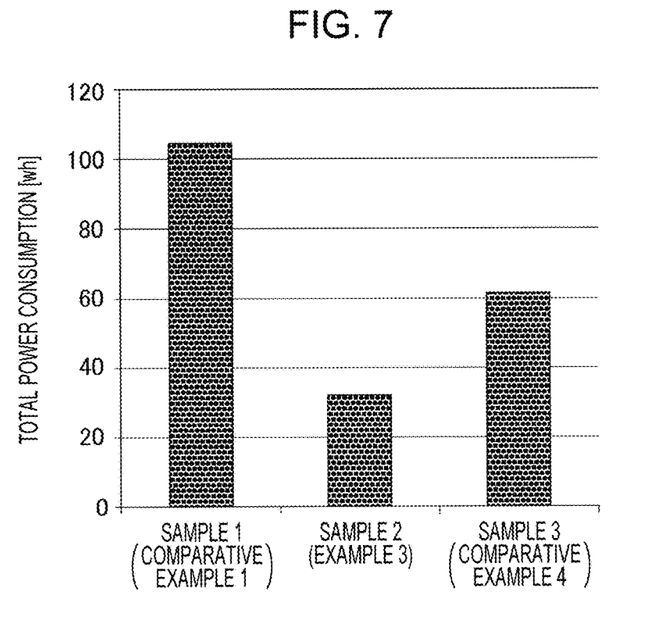
FIG. 7 is a graph illustrating evaluation results for anti-icing performance.

The results are described in FIG. 7.

FIG. 7 indicates that Sample 1 had the highest total power consumption and Sample 2 had the lowest total power consumption. Specifically, compared with the total power consumption of Sample 1 being defined as 100%, that of Sample 2 was 30.7%, and that of Sample 3 was 58.8%.

Thus, it has been found that Sample 2 enables 70% reduction in the total power consumption, compared with Sample 1.

Example 4

A coating material of Example 4 was obtained by mixing a polyurethane resin as a cold curing resin and PTFE (low molecular weight PTFE) as a particulate fluororesin such that the constituent ratio of the particulate fluororesin in the coating film was 74 wt %. In the coating material of Example 4, the polyurethane resin coating material as the cold curing resin contained a main component (red polyurethane coating material) and a curing agent in a mixing ratio of main component:curing agent=1:1. In the coating material of Example 4, the particulate fluororesin had an average particle size of 0.96 µm.

Example 5

A coating material of Example 5 was obtained as with the coating material of Example 4 except that the constituent ratio of the particulate fluororesin in the coating film was 77 wt %. In the coating material of Example 5, the particulate fluororesin had an average particle size of 0.96 µm.

Example 6

The coating material of Example 6 was obtained as with the coating material of Example 4 except that the constituent ratio of the particulate fluororesin in the coating film was 82 wt %. In the coating material of Example 6, the particulate fluororesin had an average particle size of 0.96 µm.

Evaluation of Water Repellency and Water Slippage

The coating material of Example 4 was diluted, as needed, using a solvent such as a thinner, applied to an aluminum alloy surface with a spatula, and cured at normal room temperature, to obtain a sample produced through application of the coating material of Example 4.

As with the sample produced through application of the coating material of Example 4, another sample was produced through application of the coating material of Example 5 and another sample was produced through application of the coating material of Example 6.

Each of the samples was measured in terms of water contact angle, water sliding angle, and surface roughness at room temperature.

Figure 8:
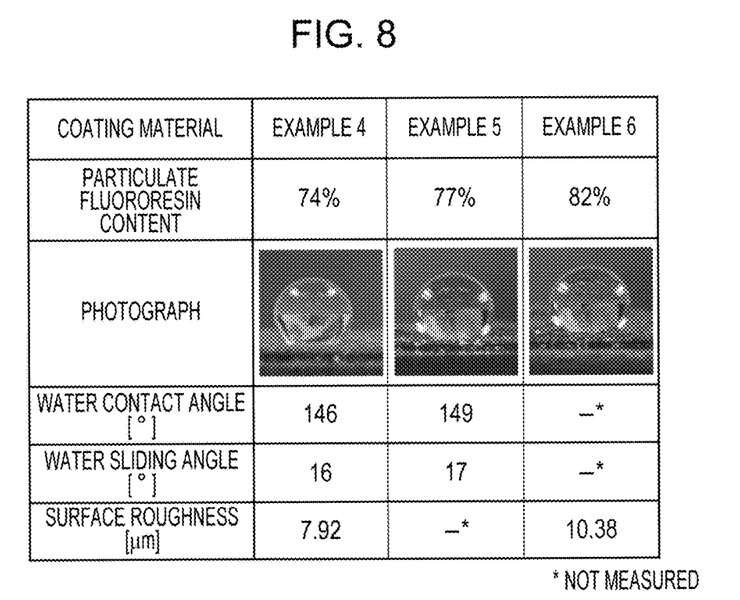
FIG. 8 describes evaluation results for water repellency and water slippage.

The results are described in FIG. 8. The sample produced through application of the coating material of Example 6 was not measured in terms of water contact angle and water sliding angle. The sample produced through application of the coating material of Example 5 was not measured in terms of surface roughness.

The results in FIG. 8 also indicate that the coating materials of Examples 4 to 6 enable formation of coating films having a water contact angle of 120° or larger, that is, highly water-repellent coating films.

The results in FIG. 8 indicate that the coating film formed of the coating material of Example 6 has a higher surface roughness than the coating film formed of the coating material of Example 4. As the surface roughness of the coated surface increases, the water repellency is enhanced but the water droplet adhesion strength increases due to the anchoring effect of the surface. Accordingly, higher surface roughness is not necessarily good; the surface roughness is preferably minimized as long as desired water repellency can be provided.

The results in Table 1 and FIG. 8 indicate that the lower limit of the constituent ratio of the particulate fluororesin of the coating film is preferably 43 wt %, more preferably 50 wt %, still more preferably 55 wt %. The results also indicate that the upper limit of the constituent ratio of the particulate fluororesin of the coating film is preferably 82 wt %, more preferably 77 wt %.

In the coating materials of Example 1 and Example 2, the particulate fluororesins had an average particle size of 1.0 μm or more and less than 1.5 μm (specifically 1.15 μm). In the coating materials of Example 3, Example 4, Example 5, and Example 6, the particulate fluororesins had an average particle size of less than 1.0 μm (specifically 0.96 μm). The particulate fluororesin having an average particle size of 1.0 μm or more and less than 1.5 μm can have sufficiently high dispersibility; however, the particulate fluororesin having an average particle size of less than 1.0 μm has higher dispersibility and enables formation of a more uniform (homogenous) coating film. The higher the uniformity of the coating film, the lower the probability that the water repellency of the coating film degrades even in the case of thinning of the film due to erosion, for example, caused by an external factor. When the coating film is uniformly formed, after it thins, it still retains water repellency that is equivalent to the original water repellency immediately after the formation thereof.

In the coating materials of Examples 4 to 6, each cold curing resin coating material contains, as the main component, a colored coating material (specifically, a red polyurethane coating material). Use of this material enables visual inspection of the film-formability of coating films and degradation (degree of peeling, for example) of coating films, for example.

The invention claimed is:

1. A wing, comprising:
   a non-water-repellent coating film that forms an outermost layer in a water droplet impact region in a leading edge portion of the wing; and
   a water-repellent coating film that includes a mixed coating material and that forms an outermost layer in a water-repellent region adjacent to the water droplet impact region,
   wherein the mixed coating material comprises:
      a cold curing resin that undergoes reaction curing at a normal room temperature; and
      a particulate fluororesin,
   wherein a constituent ratio of the particulate fluororesin in a coating film that is a cured state of the mixed coating material is 43 wt % or more and 82 wt % or less,
   wherein the non-water-repellent coating film extends from the water droplet impact region to the water-repellent region, and
   wherein the water-repellent coating film is disposed on the non-water-repellent coating film in the water-repellent region.

2. The wing according to claim 1, wherein the particulate fluororesin comprises a tetrafluoroethylene resin.

3. The wing according to claim 1, wherein the cold curing resin comprises a fluororesin.

4. The wing according to claim 2, wherein the cold curing resin comprises a fluororesin.

5. The wing according to claim 1, wherein the particulate fluororesin has an average particle size of less than 1.5 μm.

6. The wing according to claim 2, wherein the particulate fluororesin has an average particle size of less than 1.5 μm.

7. The wing according to claim 1, wherein the particulate fluororesin has an average particle size of less than 1.0 μm.

8. The wing according to claim 2, wherein the particulate fluororesin has an average particle size of less than 1.0 μm.

9. An anti-icing system comprising:
   the wing according to claim 1; and
   a heater that heats the water droplet impact region.

10. An anti-icing system comprising:
    the wing according to claim 2; and
    a heater that heats the water droplet impact region.

11. An anti-icing system comprising:
    the wing according to claim 3; and
    a heater that heats the water droplet impact region.

12. An anti-icing system comprising:
    the wing according to claim 4; and
    a heater that heats the water droplet impact region.

13. The anti-icing system according to claim 9, wherein the heater further heats at least a portion of the water-repellent region, the portion being adjacent to the water droplet impact region.

14. The anti-icing system according to claim 10, wherein the heater further heats at least a portion of the water-repellent region, the portion being adjacent to the water droplet impact region.

15. The anti-icing system according to claim 11, wherein the heater further heats at least a portion of the water-repellent region, the portion being adjacent to the water droplet impact region.

16. The anti-icing system according to claim 12, wherein the heater further heats at least a portion of the water-repellent region, the portion being adjacent to the water droplet impact region.

* * * * *